(12) United States Patent
Mukherjee

(10) Patent No.: US 7,634,604 B2
(45) Date of Patent: *Dec. 15, 2009

(54) SYSTEMS FOR GENERATING SYNCHRONIZED EVENTS AND IMAGES

(75) Inventor: Shrijeet Mukherjee, Mountain View, CA (US)

(73) Assignee: Graphics Properties Holdings, Inc., Palo Alto, CA (US)

( * ) Notice: Subject to any disclaimer, the term of this patent is extended or adjusted under 35 U.S.C. 154(b) by 126 days.

This patent is subject to a terminal disclaimer.

(21) Appl. No.: 11/340,579

(22) Filed: Jan. 27, 2006

(65) Prior Publication Data

US 2006/0123170 A1 Jun. 8, 2006

Related U.S. Application Data

(63) Continuation of application No. 10/254,804, filed on Sep. 26, 2002, now Pat. No. 7,016,998, which is a continuation-in-part of application No. 09/993,925, filed on Nov. 27, 2001, now Pat. No. 6,831,648, and a continuation-in-part of application No. 09/993,924, filed on Nov. 27, 2001, now Pat. No. 6,791,551, and a continuation-in-part of application No. 09/993,889, filed on Nov. 27, 2001, now Pat. No. 6,809,733.

(60) Provisional application No. 60/252,887, filed on Nov. 27, 2000.

(51) Int. Cl.
*G06F 13/24* (2006.01)

(52) U.S. Cl. ........................ 710/266; 713/400

(58) Field of Classification Search ........................ None
See application file for complete search history.

(56) References Cited

U.S. PATENT DOCUMENTS

| 4,991,170 A | 2/1991 | Ken |
| 5,195,186 A | 3/1993 | Trevitt et al. |
| 5,410,542 A | 4/1995 | Gerbehy et al. |
| 5,530,846 A | 6/1996 | Strong |
| 5,657,478 A | 8/1997 | Recker et al. |

(Continued)

FOREIGN PATENT DOCUMENTS

GB 2353448 8/1999

OTHER PUBLICATIONS

Bierbaum, A. et al., "Flexible Application Design Using VR Juggler," *SIGGRAPH 2000*, New Orleans, Jul. 2000, 1 page.

(Continued)

*Primary Examiner*—Khanh Dang
(74) *Attorney, Agent, or Firm*—Sterne, Kessler, Goldstein & Fox PLLC

(57) ABSTRACT

A system and method for generating sequences of triggered events and for generating global interrupts in a clustered computer graphics system is provided. In a sender-receiver dichotomy, one node is deemed the sender and the others act as receivers. The sender determines trigger values for each of the nodes in the system in order to achieve a particular operation sequence. In addition, a synchronization signal generator is provided to synchronize a timing signal between the sender and receiver nodes. Further, the sender designates one or more receiver nodes and causes them to turn on an interrupt enable register. In this way, the receiver nodes are able to be interrupted by the sender.

5 Claims, 12 Drawing Sheets

U.S. PATENT DOCUMENTS

| | | | |
|---|---|---|---|
| 5,878,216 | A | 3/1999 | Young et al. |
| 6,046,709 | A | 4/2000 | Shelton et al. |
| 6,157,395 | A | 12/2000 | Alcorn |
| 6,172,528 | B1 | 1/2001 | Malarsie |
| 6,199,169 | B1 | 3/2001 | Voth |
| 6,256,699 | B1 | 7/2001 | Lee |
| 6,449,700 | B2 | 9/2002 | Hagersten et al. |
| 6,542,754 | B1 | 4/2003 | Sayers et al. |
| 6,629,252 | B1 | 9/2003 | Gholami et al. |
| 6,646,645 | B2 | 11/2003 | Simmonds et al. |
| 6,791,551 | B2 | 9/2004 | Mukherjee et al. |
| 6,809,733 | B2 | 10/2004 | Mukherjee et al. |

OTHER PUBLICATIONS

Bierbaum, A. and Just, C., "Software Tools for Virtual Reality Application Development," *SIGGRAPH '98*, Applied Virtual Reality (Course 14), Orlando, Florida, Jul. 1998, pp. 3-2 to 3-45.

Just, C. et al., "VR Juggler: A Framework for Virtual Reality Development," *Immersive Projection Technology Workshop (IPT98)*, Ames, Iowa, May 1998, pp. 1-8.

Mano, Morris, "Computer System Architecture," 1982, Prentice-Hall, Inc., $2^{nd}$ Ed., pp. 434-440.

Frame Works Guitars, "RMC Fanout Box," 1995, http://frameworks-guitars.com/fanoutBox.html.

VGuitar System, "RMC Fanout Box," http://www.vg-8.com/accessories/fanout.

Microscan, "1B-131 Specification," 2002, Microscan Systems, Inc.

SYSTEMS FOR GENERATING SYNCHRONIZED EVENTS AND IMAGES

CROSS-REFERENCE TO RELATED APPLICATIONS

This application is a continuation of U.S. patent application Ser. No. 10/254,804, filed Sep. 26, 2002, now U.S. Pat. No. 7,016,998, which is incorporated herein by reference in its entirety.

The U.S. Pat. No. 7,016,998 is a continuation-in-part of the following non-provisional applications:

U.S. patent application Ser. No. 09/993,925 entitled "Synchronized Image Display and Buffer Swapping in a Multiple Display Environment," filed Nov. 27, 2001 by Mukherjee et al., which issued as U.S. Pat. No. 6,831,648 on Dec. 14, 2004, (incorporated by reference in its entirety herein), which is a non-provisional application of U.S. Provisional Application No. 60/252,887, entitled "Synchronized Image Display and Buffer Swapping in a Multiple Display Environment," filed Nov., 27, 2000, by Mukherjee et al., (incorporated by reference in its entirety herein);

U.S. patent application Ser. No. 09/993,924 entitled "Synchronization of Vertical Retrace For Multiple Participating Graphics Computers," filed Nov. 27, 2001, by Mukherjee et al., which issued as U.S. Pat. No. 6,791,551 on Sep. 14, 2004 (incorporated by reference herein in its entirety), which is a non-provisional application of U.S. Provisional Application No. 60/252,887, entitled "Synchronized Image Display and Buffer Swapping in a Multiple Display Environment," filed Nov., 27, 2000, by Mukherjee et al., (incorporated by reference in its entirety herein); and U.S. patent application Ser. No. 09/993,889 entitled "Swap Buffer Synchronization in a Distributed Rendering System," filed Nov. 27, 2001, by Mukherjee et al., which issued as U.S. Pat. No. 6,809,733 on Oct. 26, 2004 (incorporated by reference herein in its entirety), which is a non-provisional application of U.S. Provisional Application No. 60/252,887, entitled "Synchronized Image Display and Buffer Swapping in a Multiple Display Environment," filed Nov., 27, 2000, by Mukherjee et al., (incorporated by reference in its entirety herein.)

BACKGROUND OF THE INVENTION

1. Field of the Invention

The present invention relates generally to clustered computer graphics systems and, more particularly to the generation of sequences and interrupts between the participating nodes in the system.

2. Background Art

Obtaining visual realism is crucial in computer graphics systems. To this end, it is often necessary to produce multiple levels of images on a single display device (e.g., a CRT, LCD, active matrix or plasma display). In the alternative, some graphics systems seek to achieve visual reality by generating a large visual image across multiple display devices. Flight simulation applications are an example where multiple display devices are used. Each display contributes to the overall image by providing either a front, left, or right view of the scene. As the simulated flight progresses, each of the front, left, and right views change. Proper synchronization between the various display devices is key to maintaining the reality of the scene being presented. Load balancing is another application that requires synchronization. Computations for generating a scene are distributed among multiple processors such that the calculations are performed separately. Synchronization is necessary to ensure that each processor is providing the appropriate data for the common scene being generated.

Synchronization is made difficult, however, by the varying complexities of the images being presented on the various displays. As a result, many graphics systems will become desynchronized and produce visual artifacts or distortions in the resulting image. Previous attempts to prevent the occurrence of these distortions have been directed to hardware solutions at the graphics pipeline level.

What is needed is a solution that will work with off-the-shelf (i.e., commercially available) hardware.

Additionally, in many cases multiple computers or nodes are used to generate the overall scene being presented across the single or multiple display devices. Accordingly, each computer can be responsible, for example, for generating a particular part of the scene such as a front, left, or right view of the scene. In another design, one or more computers could be assigned the task of calculating the models for rendering the scene while another computer is assigned the task of drawing the scene. Indeed, other designs may delegate the operations performed in graphics processing.

The multiple computers or nodes are separate devices; thus, the potential for the computers to become desynchronized is increased. Accordingly, to maintain the visual realism of the scene being generated, it is also necessary to synchronize the computations in the multiple computers or nodes. Furthermore, it may at times be desirable to have the graphics processing be completed in a particular sequence. Heretofore, in order to achieve such ordering, one would have to rely upon the exchange of data packets to trigger certain events upon receipt. However, this approach is processor intensive. Further, the exchange of data packets is subject to network latency and therefore non deterministic. Any delay is likely to lead to desynchronization and could potentially result in the creation of visual distortions.

Thus, what is also needed is a solution for generating sequences and interrupts between the multiple nodes which is robust and deterministic.

BRIEF SUMMARY OF THE INVENTION

The present invention provides a graphics system and method for performing synchronized image display in a multiple display/multiple processor environment. Synchronization is achieved through a master-slave dichotomy. The present invention further provides a graphics system and method for generating sequences of triggered events and for generating global interrupts in a cluster of nodes.

The graphics system has a master system and a plurality of slave systems. Each slave system contributes to the generation of a common scene. One or more processors are included within each slave system. One processor is made responsible for controlling the functions of each slave system with respect to synchronization. Each slave system also has I/O ports to provide communications between it and the master system. A plurality of daughter cards are included within each slave system. Each daughter card is an integrated circuit board used for timing synchronization between the slave systems and the master system.

The slave systems further include a plurality of graphics processors (i.e., graphics accelerators or coprocessors). Finally, each slave system has a device driver. The device driver is responsible for receiving and processing commands to the graphics processors. The device driver also performs time synchronization with the master system and executes commands transmitted from the master. In addition, the device driver is responsible for generating sequences of triggered events. The device driver is further responsible for managing the generation of global interrupts.

The master system synchronizes the rendering and display functions of the slave systems. Like the slave systems, the master system also includes one or more processors and I/O ports. In addition, the master system has a synchronization signal generator. The synchronization signal generator is used to provide a timing signal to each daughter card located within the slave systems.

The graphics system further includes one or more multidrop cables. The multidrop cables provide communications between the slave systems and the master system. The multidrop cable is designed such that any transmission communicated over it will arrive at the I/O ports of the slave systems at approximately the same time. In further embodiments, communications between the slave systems and the master system is provided using a daisy chain wiring scheme.

The present invention addresses synchronization of vertical retrace and buffer swapping. In one embodiment, synchronization of image display and vertical retrace is achieved through transmission of a clock signal generated by the synchronization signal generator in the master system and provided in a daisy chain manner to the daughter cards located within the slave systems.

In another embodiment, synchronization of vertical retrace is achieved through a clocking means available through performance counters or processor clocks. In still another embodiment, synchronization is used to manage buffer swapping among the multiple processors so that rendering is synchronized.

The present invention also addresses generating sequences of triggered events. Accordingly, trigger values for a number of receiver nodes are determined based on a desired sequence order. These determined trigger values are sent to the receiver nodes. A common clock signal is also sent to each receiver node. To make sure each node is starting from a common point in time, a clear counter register signal is sent to each receiver node. In response to receiving the clear counter register signal, each receiver node clears its counter register. As each clock signal is received, the counter register at each node is incremented. As the counter register for each respective for each node reaches its determined trigger value, an interrupt is generated and a predetermined process or event can be executed. In this way, the sequencing of triggered events is achieved.

The present invention also addresses the generation of global interrupts from any node in the computer graphics cluster. For each node in the computer graphics system, a line enable register is set to off. Next, at least one sender node is identified from the nodes in the cluster. The line enable register for the identified sender node is turned on. A number of receiver nodes are then identified. The interrupt enable register for each of the identified receiver nodes is set to on. At a desired time, an interrupt is sent from the identified sender node to each of the other nodes in the cluster. As the interrupt is received at each node, a determination is made as to whether the receiver interrupt enable register is on. If it is, then an interrupt is issued and a predetermined task is executed.

BRIEF DESCRIPTION OF THE FIGURES

The present invention also addresses generating sequences of triggered events. Accordingly, trigger values for a number of receiver nodes are determined based on a desired sequence order. These determined trigger values are sent to the receiver nodes. A common clock signal is also sent to each receiver node. To make sure each node is starting from a common point in time, a clear counter register signal is sent to each receiver node. In response to receiving the clear counter register signal, each receiver node clears its counter register. As each clock signal is received, the counter register at each node is incremented. As the counter register for each respective node reaches its determined trigger value, an interrupt is generated and a predetermined process or event can be executed. In this way, the sequencing of triggered events is achieved.

DETAILED DESCRIPTION OF THE INVENTION

Table of Contents

I. System Embodiments
II. Synchronized Image Display
III. Synchronized Swap Ready
IV. Generating Sequences of Triggered Events
V. Generating Global Interrupts The present invention relates to processing in a cluster of nodes. One aspect of the invention generates sequences of triggered events in a cluster of nodes. Another aspect of the invention generates global interrupts from any node in a cluster. One example environment for such processing is synchronizing image display and buffer swapping in a multiple display environment.

I. System Embodiments

Figure 1:
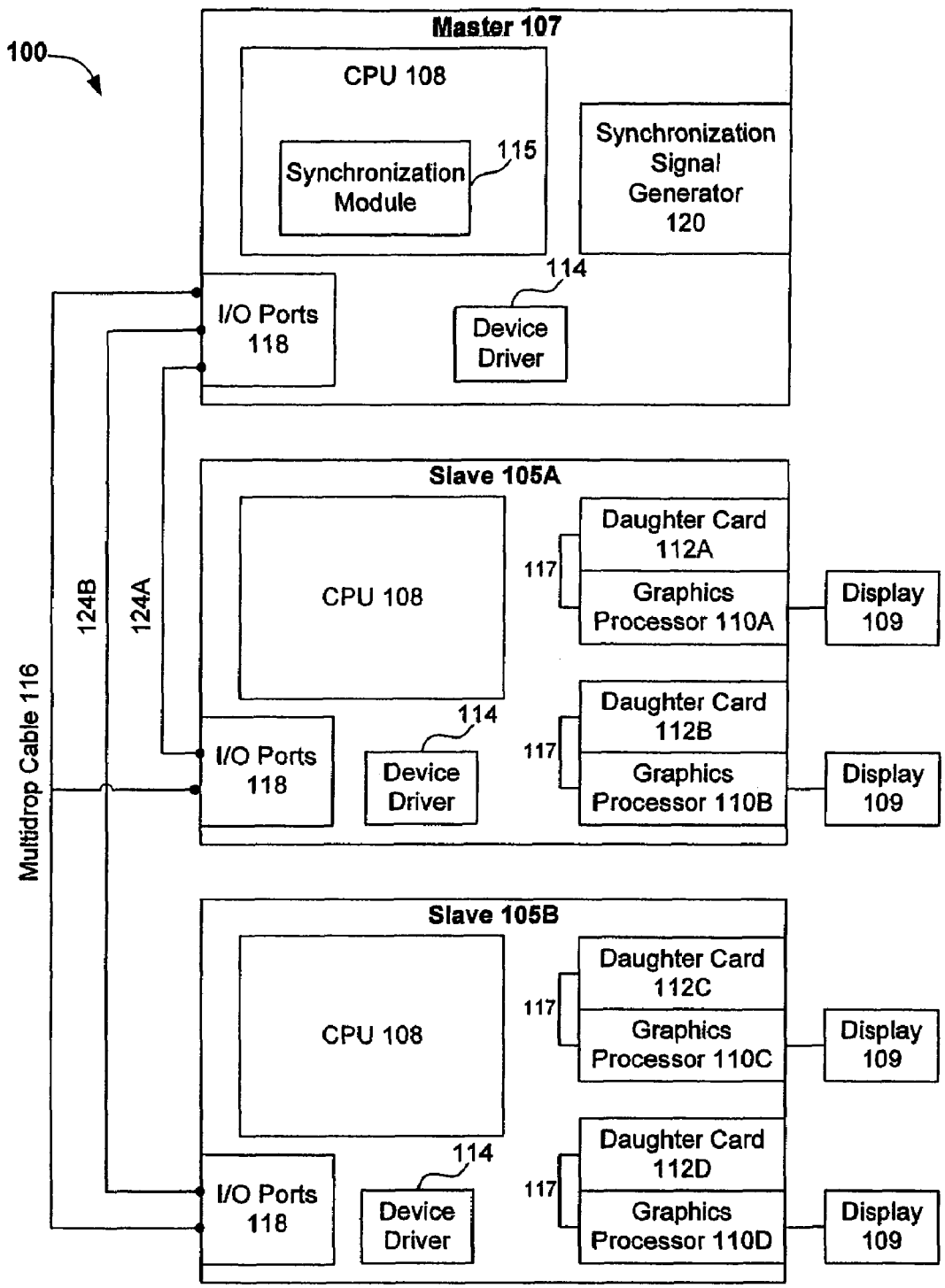
FIG. 1 is a diagram of a computer system according to an embodiment of the present invention.

FIG. 1 is a diagram of a graphics system according to an embodiment of the present invention. The graphics system 100 has a master system 107 and a plurality of slave systems 105A and 105B. Each slave system 105 contributes to the generation of a common scene in displays 109. The graphics system 100 can also be configured as a cluster, wherein master system 107 and each slave system 105 are peer computer systems or nodes within the cluster. Further, in an embodiment, the nodes in clustered graphics system 100 are referred to as receiver nodes and sender nodes.

Each slave system 105 has a processor 108. Processor 108 is responsible for controlling the functions of each slave system 105. Each slave system 105 also has I/O ports 118 to provide communications between it and master system 107. I/O ports 118 can be any interface supporting broadcast and point to point communications such as, serial ports, parallel ports, firewire, or SCSI, for example.

A timing signal provider for propagating a time synchronization signal is also included within each slave system 105. In one embodiment, the timing signal provider is implemented using a plurality of daughter cards 112. Each daughter card 112 is an integrated circuit board used for providing external clock synchronization between the slave systems 105 and master system 107. In the case where multiple daughter cards 112 are used within an individual slave system 105, then the daughter cards 112 can be connected to one another in a daisy chain. In this way, each daughter card acts as a repeater and provides signal amplification of an external clock signal generated in a master system.

In an alternative embodiment, the timing signal provider is implemented using a fanout box having signal amplifiers. The external synchronization signal is then provided to the fanout box which in turn provides the signal directly to each graphics processor. After reading this disclosure, one skilled in the relevant arts will recognize other implementation arrangements for propagating the time synchronization signal without departing from the scope of the present invention.

Slave system 105A and slave system 105B further include a plurality of graphics processors (i.e. graphics accelerators or coprocessors) 110. Graphics processors 110 may be any known graphics processor such as the GeForce2 graphics processing unit available from Nvidia Corporation, Santa Clara, Calif., for example. A connector 117, is provided to connect each daughter card 112 to a graphics processor 110. Connector 117 is an internal wire or cable able to transmit an electrical signal between the internal hardware. Finally, each slave system 105 has a device driver 114.

Device driver 114 is responsible for executing commands from master system 107 and providing processing commands to graphics processors 110. In addition, device driver 114 contains control logic for generating sequences of triggered events in the cluster or graphics system 100. Still further, device driver 114 contains control logic for generating an interrupt. In this way, global interrupts from any node in the cluster graphics system 100 is possible.

Figure 8:
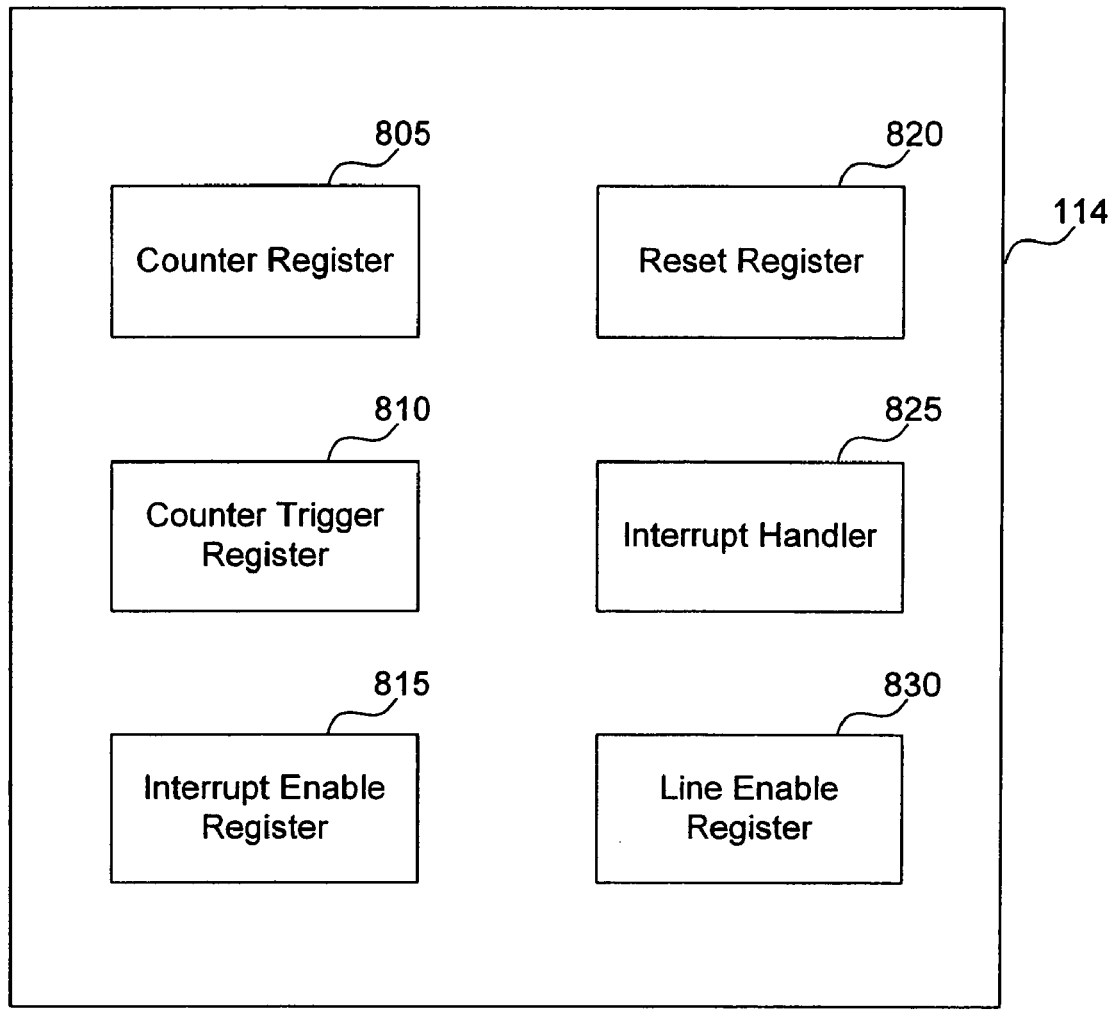
FIG. 8 is a diagram of an example device driver architecture in an implementation of the present invention.

FIG. 8 illustrates the architecture of device driver 114 according to an implementation of the present invention. A counter register 805 is used to count the synchronization signal (e.g., clock signals) generated by the synchronization signal generator 115. A counter trigger register 810 generates an interrupt when the counter register 805 reaches a determined value. An interrupt enable register 815 is used to determine whether an interrupt has been received or not. A reset register 820 is used to clear the counter register 805 and the counter trigger register 810 when appropriate. An interrupt handler 825 is used to control the response to an interrupt. Finally, a line enable register 830 is used to determine whether the device driver 114 can read and or write via the communications links.

Master system 107 is used to synchronize the rendering and display functions of slave systems 105A and 105B. Master system 107 includes a processor 108, I/O ports 118, Device driver 114, and a synchronization signal generator 120. Master system I/O ports 118 exchange communications with the I/O ports 118 of each slave system 105 using respective communications cables 124. Synchronization signal generator 120 is used to provide a pulse stream signal 122 to each daughter card 112. In an embodiment, each slave system 105 is also provided with a synchronization signal generator. In this way, any node can drive the system 100. Synchronization signal generator 120 can provide any signal from which timing information can be extracted. In one embodiment, synchronization signal generator 120 provides a clock signal. In an alternative embodiment, synchronization signal generator provides a video signal.

Video signals have timing signals embedded within them. Upon receiving the video signal, daughter cards 112 can extract the timing signal and pass it on to the graphics processors 110. This timing signal would be used to provide clock synchronization between the master system 107 and the slave systems 105A and 105B.

Master system 107 further includes a synchronization module 115. Synchronization module 115 contains control logic that manages the synchronization of vertical retrace and frame buffer swapping between the slave systems 105A and 105B.

Graphics system 100 also includes a plurality of communications links. In an embodiment, the communications links are configured so that the participation of each node on the communications link is selectable. Thus, in an embodiment, the communications links are comprised of multiple open-collector style wires. Alternatively, a wired-AND implementation of the communications links can be utilized.

In an embodiment, one communications link is reserved for transmitting the time synchronization signal to each node. In one embodiment, the communications links are implemented using for example, a multidrop cable 116. Multidrop cable 116 provides communications between slave systems 105A and 105B and master system 107. Multidrop cable 116 could be, for example, a multi-connection coaxial cable. In accordance with this embodiment, multidrop cable 116 is designed such that any transmission communicated over it will arrive at the I/O ports 118 of slave system 105A and slave system 105B at approximately the same time.

In an alternative embodiment, the communications link is implemented using a daisy chain wiring scheme. This alternative is useful when the slave systems and master system are close enough for transmissions to be propagated to each node within an acceptable time frame. For example, within 10 microseconds.

Each of the slave systems 105 and master system 107 can be any computer system or systems, for example, a personal computer, workstation or mainframe. While graphics system 100 has been described as having three separate computer systems, this is intended by way of example only and not limitation.

In an alternative embodiment, slave systems 105 and master system 107 could be implemented into a single computer system having one or more processors 108. In this case, communications between the slave systems 105 and the master system 107 would rely upon inter-processor buses instead of a multidrop cable to provide broadcast communications. Furthermore, serial communications would be replaced with point to point communications. Similarly, the elements of the slave systems 105 and master system 107 are shown in separate boxes for convenience of discussion. After reading this disclosure, one skilled in the relevant arts will recognize other implementation arrangements without departing from the scope of the present invention.

Figure 2:
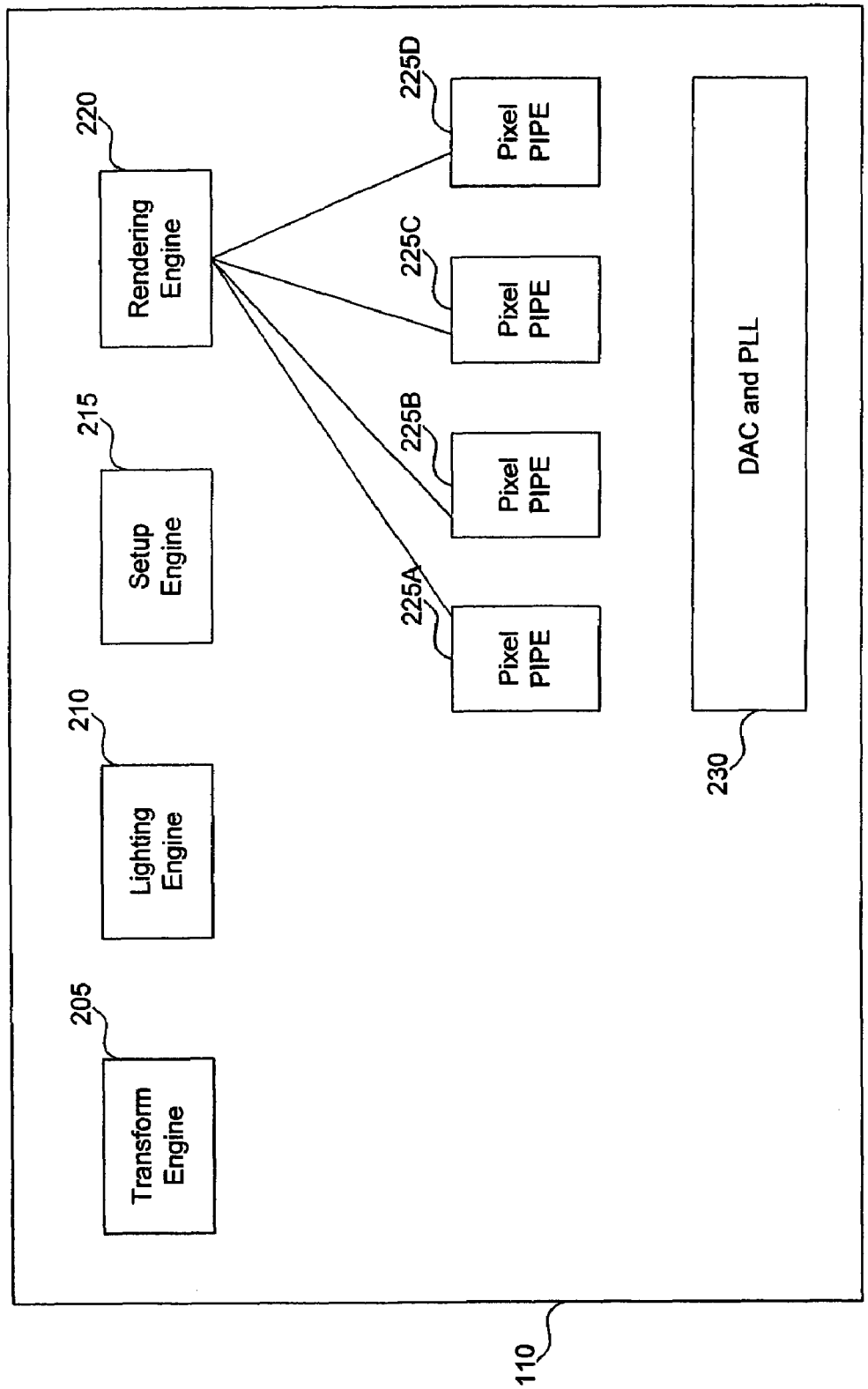
FIG. 2 is a diagram of an example graphics architecture in an implementation of the present invention.

FIG. 2 illustrates the graphics architecture of an Nvidia chip used for graphics processor 110 according to an implementation of the present invention. Graphics processor 110 includes a Transform Engine 205, a Lighting Engine 210, a Setup Engine 215, and a Rendering Engine 220. Rendering Engine 220 is further associated with a plurality of pixel pipes 225, designated Pixel Pipe 225A, Pixel Pipe 225B, Pixel Pipe 225C, and Pixel Pipe 225D.

Graphics processor 110 also includes a Digital Analog Converter (DAC) 230 and a crystal oscillator (not shown). The DAC 230 is used to generate the video signals shown in the common scene on displays 109. The architecture and operation of graphics processor 110 would be apparent to one skilled in the relevant art and thus further description is not provided.

II. Synchronized Image Display

As previously discussed, it is important that the images generated by slave systems 105 and displayed on displays 109 be synchronized with respect to time and position. A method for synchronizing vertical retrace between the slave systems 105 is now described with reference to FIG. 1 and the steps illustrated in FIG. 3.

Figure 3:
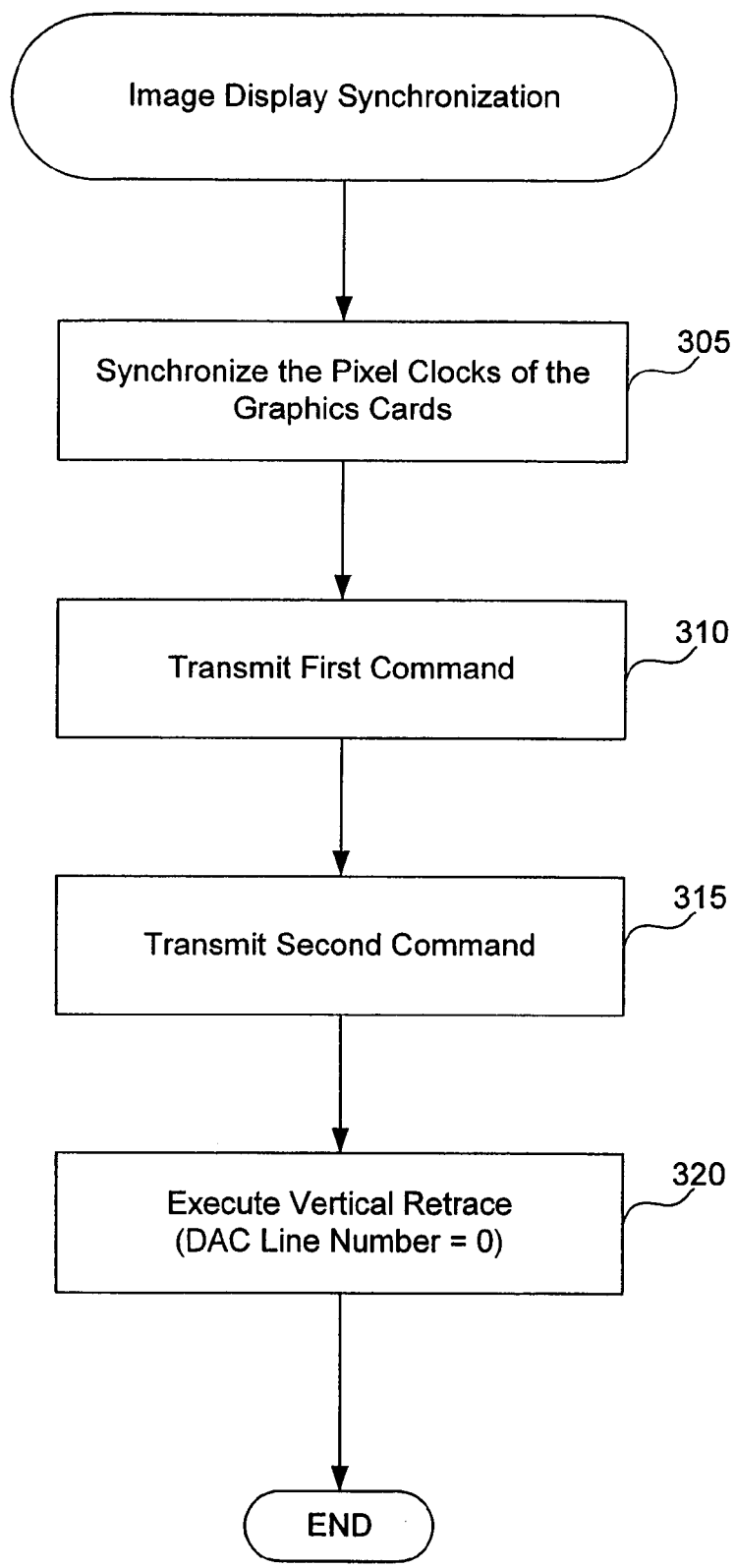
FIG. 3 is a flowchart of a method for synchronizing video display according to a preferred embodiment of the present invention.

FIG. 3 is a flowchart of a method for image display synchronization according to an embodiment of the present invention. Synchronization is used to ensure that each DAC 230 reads pixels at the same rate and from a common point as the DACS 230 of the other graphics processors 110.

In a step 305, the slave systems 105A and 105B are synchronized. Synchronization is achieved by applying a clock signal 122 from synchronization signal generator 120 to each daughter card 112A, 112B, 112C, and 112D. The clock signal 122 is subsequently provided to graphics processors 110A, 110B, 110C, and 110D through connectors 117. In one embodiment, connector 117 attaches to a clock override port (not shown) that is provided with graphics processor 108 during manufacture. However, not all commercially available graphics processors have such an override port. Therefore, in an alternate embodiment, connector 117 is a pigtail connector. In this case, the oscillator crystal (not shown) on graphics processor 110 is removed from its socket. A pigtail connector 117 is then used to connect clock signal 122 directly into the socket.

Synchronization signal generator 120 is designed to produce a clock signal at any desired rate, such that pulses are fed in a homogenous manner to each graphics processor 110 present in system 100. Once clock synchronization has been achieved, it should be apparent that the pixels will be presented by each DAC 230 at the same rate. However, to obtain complete synchronization it is also necessary to make sure that each DAC 230 starts at a common point.

Most standard VGA controls permit the DAC to be reset to allow for safe change of formats. In a multiple display environment, such as that contemplated by the present invention, it is important that upon executing vertical retrace all the systems are reset to start displaying the next frame at approximately the same position. For example, a level of acceptable variance is typically the time that it takes to display one line of data. In a 1280×1024 display presenting data at a refresh rate of 60 frames per second, one line equates to approximately 13 microseconds. The present invention allows all DAC's to be synchronized to meet this requirement.

In step 310, synchronization module 115 transmits a first command over multidrop cable 116 to the I/O port 118 located on each slave system 105. Multidrop cable 116 helps to ensure that the command is received and consequently executed by slave systems 105A and 105B to reset their respective DACS at approximately the same time. Alternatively, the first command could be passed from synchronization module 115 to slave system 105A and then to slave system 105B. This daisy chain approach is useful when the master system and slave systems are, for example, within two or three feet of one another.

This first command puts each slave system 105 into a busy or poll state, with all interrupts disabled. Once during each clock cycle, slave systems 105A and 105B will poll for a reset command.

In step 315, synchronization module 115 transmits a second command to each slave system 105. This second command is a request for each DAC 230 to perform a vertical reset. The vertical reset designates a specific line number where the vertical retrace is to begin. Typically, line zero (0) is selected. Upon receipt of the second command, in step 320, each slave system 105A and 105B causes its associated DAC 230 to reset to the specified line number. As a result, slave systems 105 are synchronized such that they begin displaying at the same rate and at a common point in the scene.

In another embodiment of the present invention, latency measurements and performance counters are used to synchronize image display. The transfer of signals between devices over serial ports or the Internet for example, is subject to transmission delays. The time differential between when a signal is transmitted and when it is received is known as latency.

Processor clocks are present in most computer processors. In some processors such as those provided by Intel Corporation, Santa Clara, Calif. or MIPS Technologies Inc., Mountain View, Calif., for example, the processor clocks are referred to as performance counters. Performance counters are incremented once during each clock cycle. Therefore, there is a direct relationship between the number of performance counter increments and a processor's cycle time.

Figure 4:
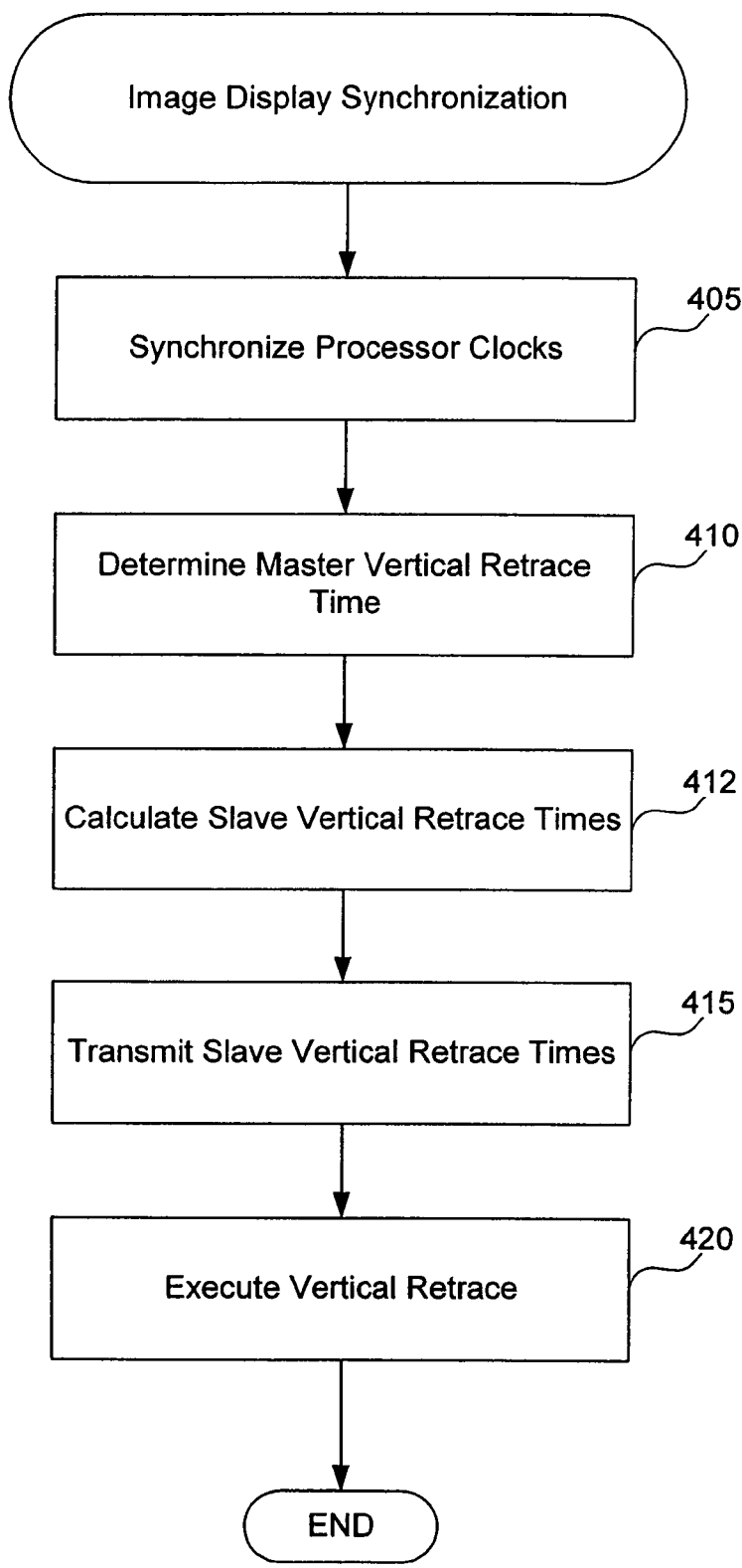
FIG. 4 is a flowchart of a method for synchronizing video display according to an alternative embodiment of the present invention.

FIG. 4 is a flowchart describing an alternative method for providing image display synchronization. In a step 405, the internal system clocks present in general purpose computers are used for synchronization. Step 405 is described with reference to FIG. 5.

Figure 5:
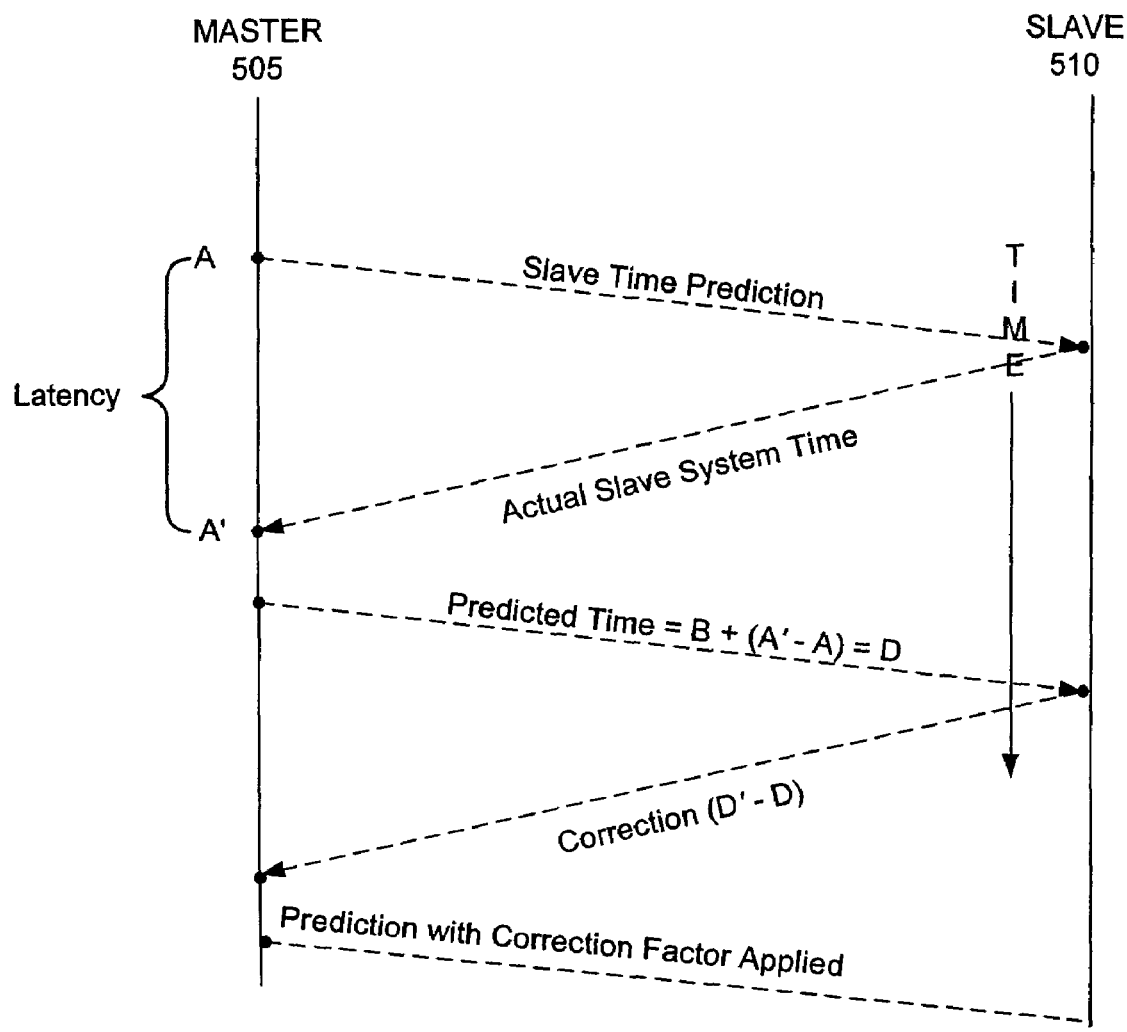
FIG. 5 is a diagram that illustrates synchronization according to an embodiment of the present invention.

FIG. 5 shows both a master system 505 and a slave system 510. A slave time prediction (A) is made by synchronization module 115. This time prediction represents the time that synchronization module 115 believes the transmitted slave time prediction will arrive at slave system 510. Upon receipt of the slave time prediction, slave system 510 returns its clock time (A') to synchronization module 115. Synchronization module 115 then determines the difference between the slave time prediction A and the actual slave system time A'. Synchronization module 115 will then make another slave time prediction (D). Slave time prediction D is obtained by adding the difference between the predicted slave time and the actual slave time (A'-A) to the current time (B) of master system 505. The slave system will again return its system time. Synchronization module 115 will continue to make time predictions and comparisons until the slave time prediction and actual slave system times are equal. Once these values are equal, synchronization module 115 is able to determine a master vertical retrace time based upon the time differential between the predicted time of receipt and actual time of receipt. For example, if the time prediction (A) is 2:32:03 and slave system 510 returns a clock time of 2:32:06 synchronization module 115 will know that its prediction is off by three seconds. In making the next prediction, synchronization module 115 will increase its approximation by three seconds to account for the time differential attributable to latency. If the returned clock time (A') equals the last prediction time sent then synchronization has been achieved. The final increment needed to make the slave prediction time and the actual prediction time equal is deemed the correction factor. The method will be further described with reference to FIG. 1 and the additional steps described in FIG. 4.

In a step 410, synchronization module 115 determines a master vertical retrace time. The master vertical retrace time indicates when the master system 107 should execute vertical retrace. In determining the master vertical retrace time, synchronization module 115 first determines the correlation between the length of a frame and master system's 107 performance counter. To do so, synchronization module 115 determines how many increments are made to master system's 107 performance counter while displaying the frame. The number of performance counter increments (typically in nanoseconds) is proportional to a processors cycle time. Thus, from the number of performance counter increments, synchronization module 115 is able to determine the time when vertical retrace occurs. Synchronization module 115 then determines the number of nanoseconds that correspond to the number of master system performance counter increments and adds this value to master system's current clock time to determine when the next vertical retrace should occur.

For example, assume the first frame being displayed takes 16 milliseconds to display and that each successive frame is expected to take the same amount of time. When display of the frame is begun, the master system's clock has the time 2:32:03 and x milliseconds. The performance counter is incremented once during display of the frame. Accordingly, the next vertical retrace can be expected to occur at 2:32:03 and x+16 milliseconds. This time becomes the master's vertical retrace time. Now, rather than waiting for an I/O interrupt to execute vertical retrace, master system 107 can simply execute a vertical retrace when its clock reaches the determined time for vertical retrace. Although the example suggests that each frame is presented one after the other without measurable time difference, it should be apparent to one skilled in the relevant art that some nanosecond periods of latency might occur.

Once the synchronization module 115 has determined the time for vertical retrace with respect to master system 107, it is ready to determine a slave vertical retrace time for slave systems 105A and 105B.

In step 412, a slave vertical retrace time for each slave system 105A and 105B is determined. This time is based upon the master system's 107 vertical retrace time and the correction factor determined in step 405. During presentation of the frame, synchronization module 115 determines a slave vertical retrace time for each slave 105A and 105B by adding the correction factor to the master's vertical retrace time determined in step 410.

For example, where the master system's 105A vertical retrace time was determined above to be 2:32:03 and x+16 milliseconds and the correction factor from step 405 was determined to be 3 seconds, slave system's 105B vertical retrace time would be 2:32:06 and x+16 milliseconds.

In a step 415, the respective slave vertical retrace times are transmitted to slave systems 105A and 105B using their respective communications cable 124A and 124B.

In a step 420, slave system 105A and slave system 105B will execute vertical retrace when their respective clocks reach the slave vertical retrace time. Since synchronization module 115 has calculated each slave system's vertical retrace time with respect to master system 107, the vertical retrace can be expected to occur at approximately the same time, despite any variation in the times of each slave's system clock.

Step 405 is repeated periodically to re-synchronize master system 107 and slave systems 105A and 105B. The determination of how frequently is dependant upon the amount of drifting or disparity observed between the slave time predictions and actual slave system times. At most, the master system 107 and slave system's 105A and 105B are re-synchronized once during each frame.

As mentioned above, synchronization of when vertical retrace occurs is only one requirement needed to be met. In addition, steps must be taken to ensure that when slave systems 105A and 105B execute vertical retrace, DACS 230 (see FIG. 2) are reset to a common point. Accordingly, when sending the slave vertical retrace times, synchronization module 115 will also designate a specific line number where the vertical retrace is to begin.

III. Synchronized Swap Ready

In a multiple processing environment, it is necessary to make sure that each slave system has its graphics processors perform buffer swapping at approximately the same time. Buffer swapping is normally performed during the time of vertical retrace just described. However, despite the close synchronization of vertical retrace among the several slave systems, steps still need to be taken to synchronize frame buffer swapping among the plurality of slave systems, else the display will be synchronized but the data displayed will be out of sync.

One approach to synchronizing swap ready maintains registers indicating the swap status of each processor in the system. The processors monitor the register for a signal indicating that all graphics processors are ready to swap. While some processors get the signal during or before vertical retrace and are able to swap immediately, others do not, and must wait until they hit the next vertical retrace before swapping. Thus, a method for determining the swap ready status of each processor before reaching vertical retrace is needed.

Figure 6:
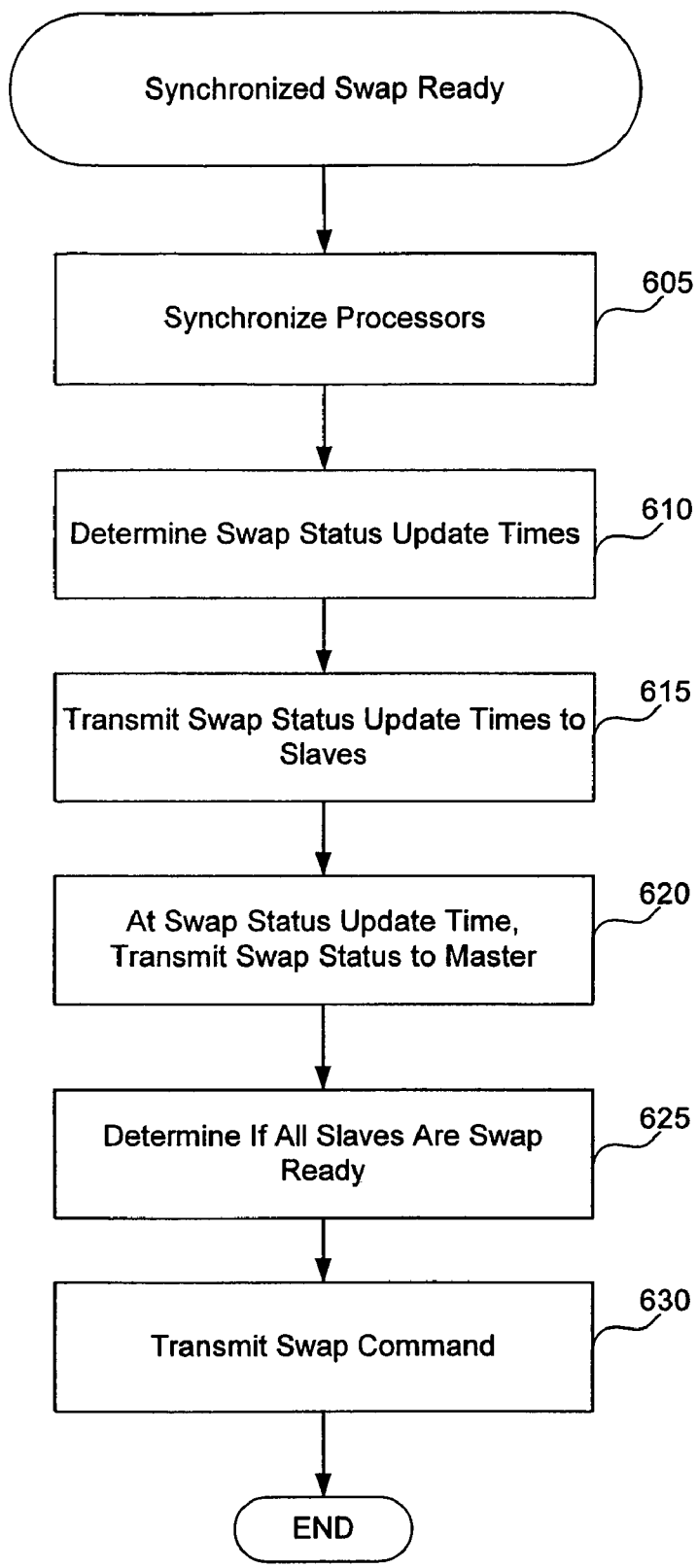
FIG. 6 is a flowchart of a method for synchronizing buffer swapping according to an embodiment of the present invention.

A method for synchronizing buffer swapping between each slave system 105A and 105B is now described with reference to FIG. 1 and the steps illustrated in FIG. 6.

In a step 605, synchronization module 115 performs clock synchronization between master system 107, slave system 105A, and slave system 105B according to the routine described above with respect to FIG. 5.

In a step 610, synchronization module 115 will determine a swap status update time for master system 107 and slave systems 105A and 105B. The swap status update time indicates when each slave system 105 needs to transmit its swap ready status to synchronization module 115. The swap status update time is determined by adding the correction factor determined in step 405, master system swap status update time, and the vertical retrace time determined in steps 405-420.

In a step 615, each slave's respective swap status update time is sent over its respective communications cable 124A and 124B. In a step 620, upon reaching the swap status update time, each slave system 105A and 105B transmits its swap status to master system 107 over its communications cable 124. The swap status will inform synchronization module 115 of whether slave system 105A and slave system 105B are ready to swap buffers. Each of the graphics processors 110 associated with slave systems 105A and 105B will eventually indicate that they are swap ready, however, device drivers 114 and 114 will withhold the instruction to swap frame buffers until the swap command is transmitted by synchronization module 115.

In a step 625, synchronization module 115 will determine when all slave systems 105 are swap ready. Once all slave systems 107 have communicated a swap status indicating that they have completed rendering and are swap ready, in a step 630, synchronization module 115 will cause master system 107 to send a broadcast swap command to each slave system 105 over multidrop cable 116. Alternatively, the broadcast swap command could be passed from the master system 107 to each slave system 105 using a daisy chain communication scheme.

Generally, swap ready status is determined by the transmission of either a high or low signal. If the signal is high then the processor has completed rendering the current buffer and is ready to switch. If the signal is low then rendering is still in progress. In a graphics system comprised of multiple graphic processors, each signal contributes to the overall status of the system. Accordingly, if any one graphics processor is not ready, then the signal transmitted will be low. Therefore, in effect, the swap command transmitted in step 630 is not transmitted until the slave system 105 processing the most complicated image has completed its rendering routine.

Figure 7:
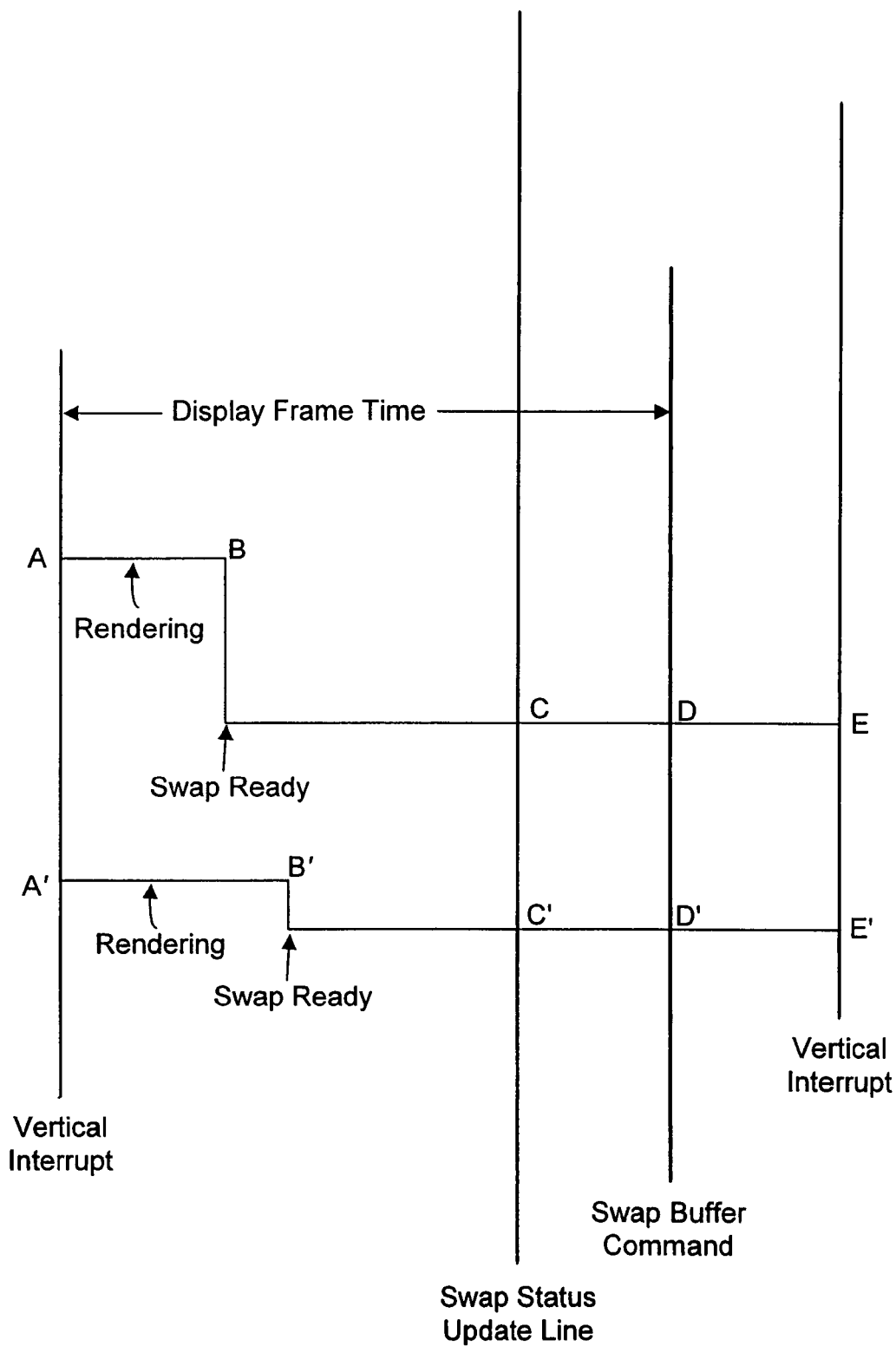
FIG. 7 is a diagram that illustrates synchronization of frame buffer swapping according to an embodiment of the present invention.

FIG. 7 provides a diagram of synchronized frame buffer swapping according to a method of the present invention. Each frame displayed in a scene is proceeded and followed by a vertical interrupt. While one frame is being displayed another is being rendered by the graphics processors. The points A and A' represent the point in which two graphics processors begin rendering a next frame. The point B represents the time when the first graphics processor completes its rendering routine. This graphics processor is now swap ready. Upon receiving a command to swap, the graphics processor will execute its frame buffer swapping routine. The second graphics processor does not become swap ready until some time later, as shown by the point B'. To ensure that both graphics processors become aware of each other's swap status in time to execute their frame buffer swap routines at approximately the same time, a swap status update time C and C' are determined. These points represent the time when each graphics processor will send its swap status to the master system. The master system is then able to transmit a swap buffer command which is received by the graphics processors as represented by points D and D'. Each processor will then execute a frame buffer swap during the next vertical interrupt it encounters. The next vertical interrupt occurs at the points labeled E and E' which because of vertical retrace synchronization, can be expected to occur at approximately the same time.

IV. Generating Sequences of Triggered Events

As previously discussed, at times it may be preferred to have the nodes in the clustered graphics system 100 perform operations in a particular sequence. A method for generating sequences of triggered events in a cluster of nodes is now described with reference to FIGS. 1 and 8 and the steps illustrated in FIG. 9.

Figure 9A:
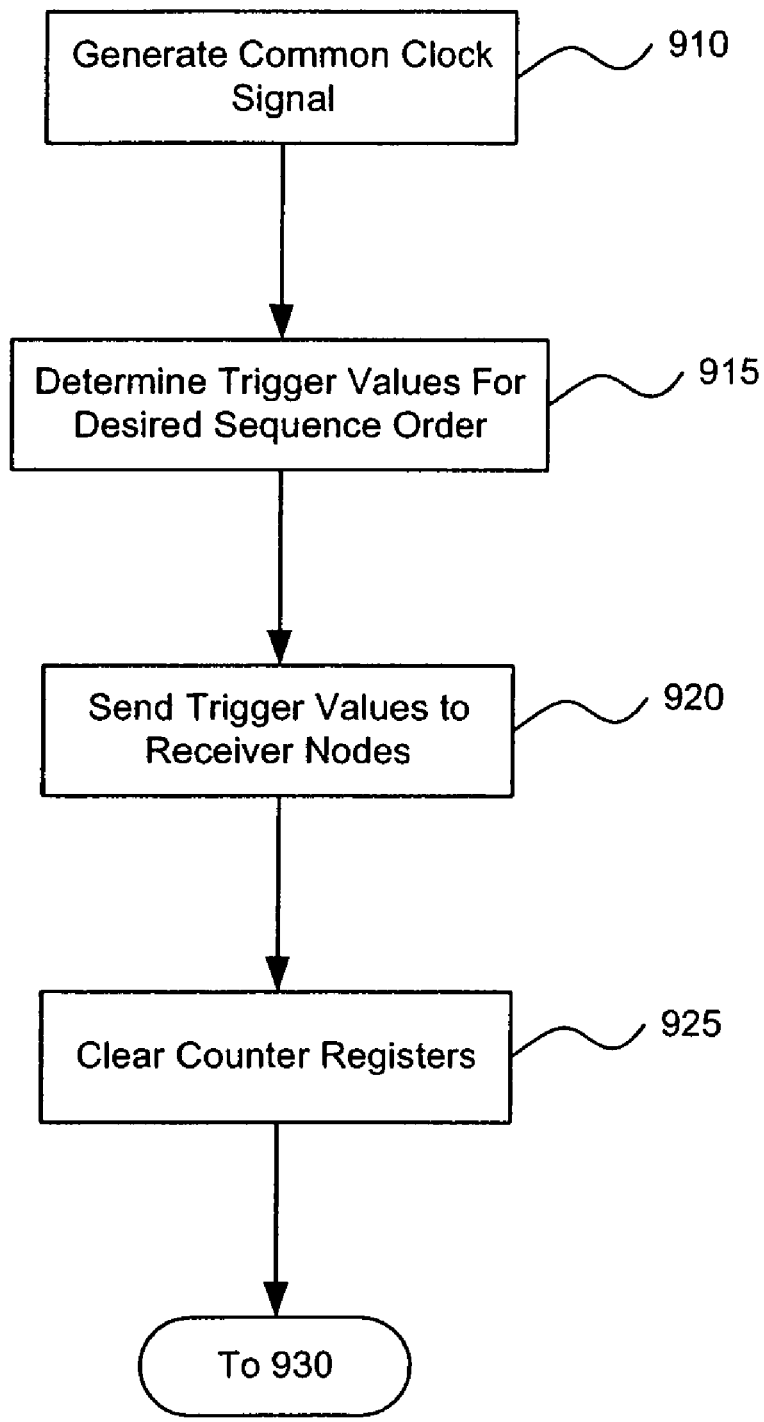
FIGS. 9A-9B illustrate a flowchart of a method for generating sequences of trigger events according to an embodiment of the present invention.
Figure 9B:
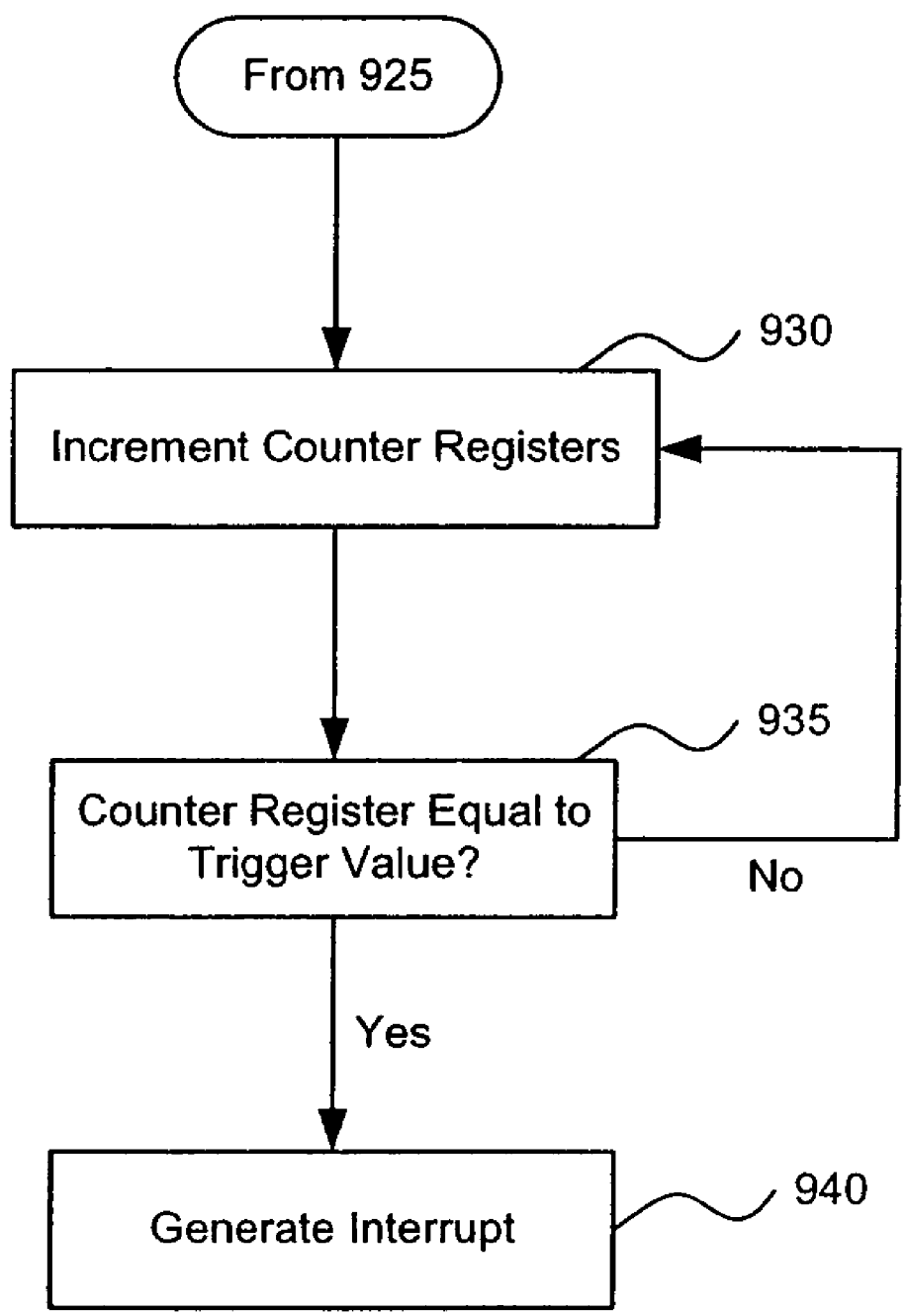

FIGS. 9A and 9B illustrate a flowchart of a method for generating sequences of triggered events according to an embodiment of the present invention.

Prior to step 910, one of the nodes in the cluster of nodes 100 is designated as the sender node. The remaining nodes are referred to as receiver nodes. Using FIG. 1 as an example, master system 107 would be referred to as the sender node and slave systems 105 would be the designated receiver nodes.

Referring to FIG. 9A, in a step 910, a common clock signal is generated and sent to each node. In an embodiment, the synchronization signal generator 120 of the sender node is used to provide the common clock signal to each of the receiver nodes.

Next, trigger values for the sender node and each receiver node are determined based on a desired sequence order (step 915). The trigger values represent the point in the timing cycle when each node is to perform a particular function.

Once the trigger values have been determined, then in a step 920, the trigger values are sent to each of the receiver nodes. In an embodiment, each node stores its trigger value in its respective counter trigger register 810.

In a step 925, a clear counter register signal is sent to each receiver node. Referring to FIG. 9B, in response to receiving the clear counter register signal, each receiver node will clear its counter register 805. The sender node will clear its counter register too. In an embodiment, reset register 820 will be used to load the counter register 805 with the appropriate reset value, for example one (1).

Next, in a step 930, as each pulse of the common clock signal is received, the sender node and each receiver node will increment its counter register 805.

In a step 935, each node will determination if the value stored in its counter register 805 equals the determined trigger value stored in its counter trigger register 810.

Continuous clock signals will be received by each node and each respective counter register 805 incremented. At a step 940, when the respective counter register 805 and determined trigger value for a particular node are equal, the node will generate an interrupt. By varying the determined trigger values for each node, the timing of when a particular operation is performed can be controlled. In this way, generated sequences of triggered events is achieved.

The following is a high level pseudocode description of an Alpha blending routine performed in accordance with an embodiment of the present invention.

```
Alpha_blend ( )
{
  snd_by_ethernet (initialize_connection_ImageSync);
  while (1) {
      // clear the sender counter and the remote counters
      write_imagesync (CounterResetReg, 1);
      snd_by_ethernet (node1,
              registerImageSyncCounterResetFunc (1));
          snd_by_ethernet (node2,
              registerImageSyncCounterResetFunc (1));
      snd_by_ethernet (node3,
              registerImageSyncCounterResetFunc (1));
      // read sender counter and setup the trigger times for the receiver
nodes.
      counterReg = read_imagesync (CounterReg);
      triggerNode1 = counterReg + 13 MILLISEC;
      triggerNode2 = counterReg + 14 MILLISEC;
      triggerNode3 = counterReg + 15 MILLISEC;
      // setup the receiver nodes.
      Snd_by_ethernet (node1, registerImageSyncCounterFunc
      (triggerNode1, drawBlock (0)));
      Snd_by_ethernet (node2, registerImageSyncCounterFunc
      (triggerNode1, drawBlock (1)));
      Snd_by_ethernet (node3, registerImageSyncCounterFunc
      (triggerNode1, drawBlock (3)));
  }
}
``` where, the function registerImageSyncCounterFunc(nodeID, remoteFunctioName (drawSection)) is used to setup the interrupt handler on each node remotely. The argument to the function drawBlock indicates which section of the block that the node is responsible for drawing. The trigger values are setup for each node, each frame and assumes that the smallest earliest block will be done within 13 milliseconds. If each of the blocks were drawn on different nodes (as the example implies), then by changing the trigger interval on each of the nodes, you could change the temporal order of the rendering of each block. If the rendered sections were being blended together, the changing of the trigger interval would be the same as changing the blend order (or the blend function).

V. Generating Global Interrupts

Figure 10A:
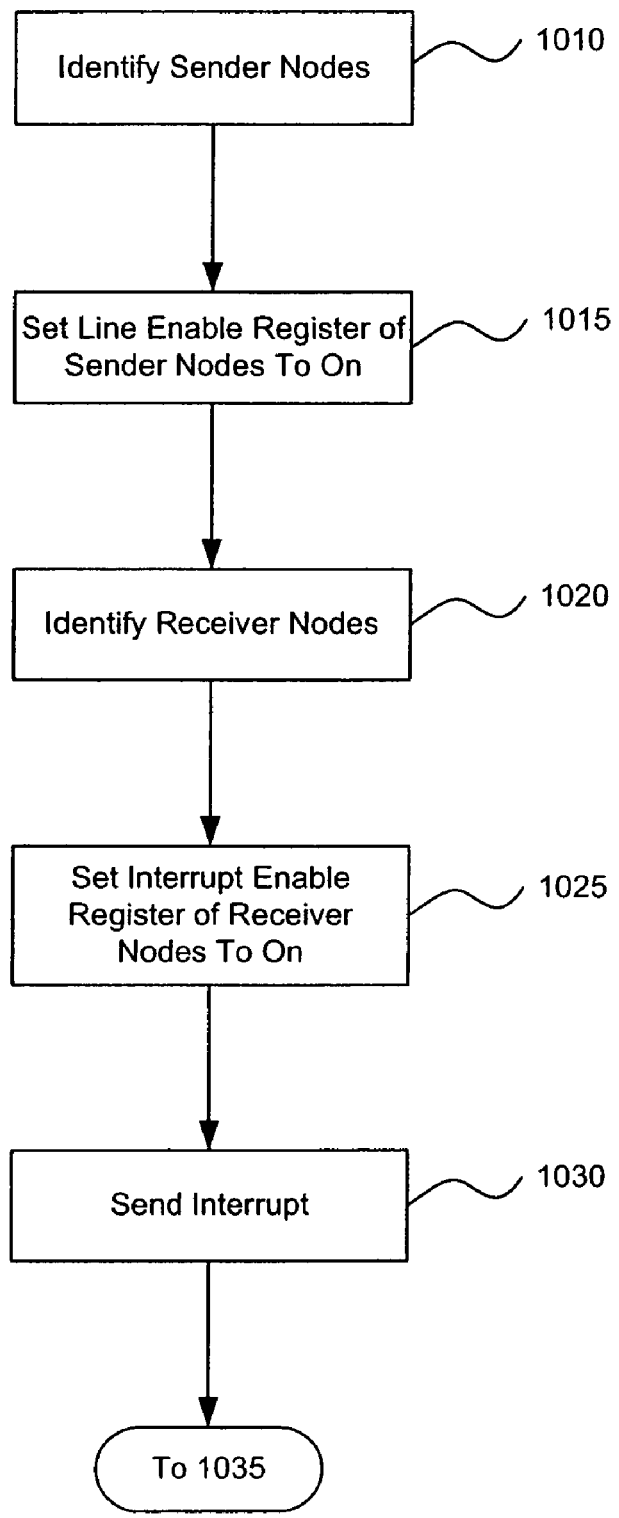
FIGS. 10A-10B illustrate a flowchart of a method for generating global interrupts according to an embodiment of the present invention.
Figure 10B:
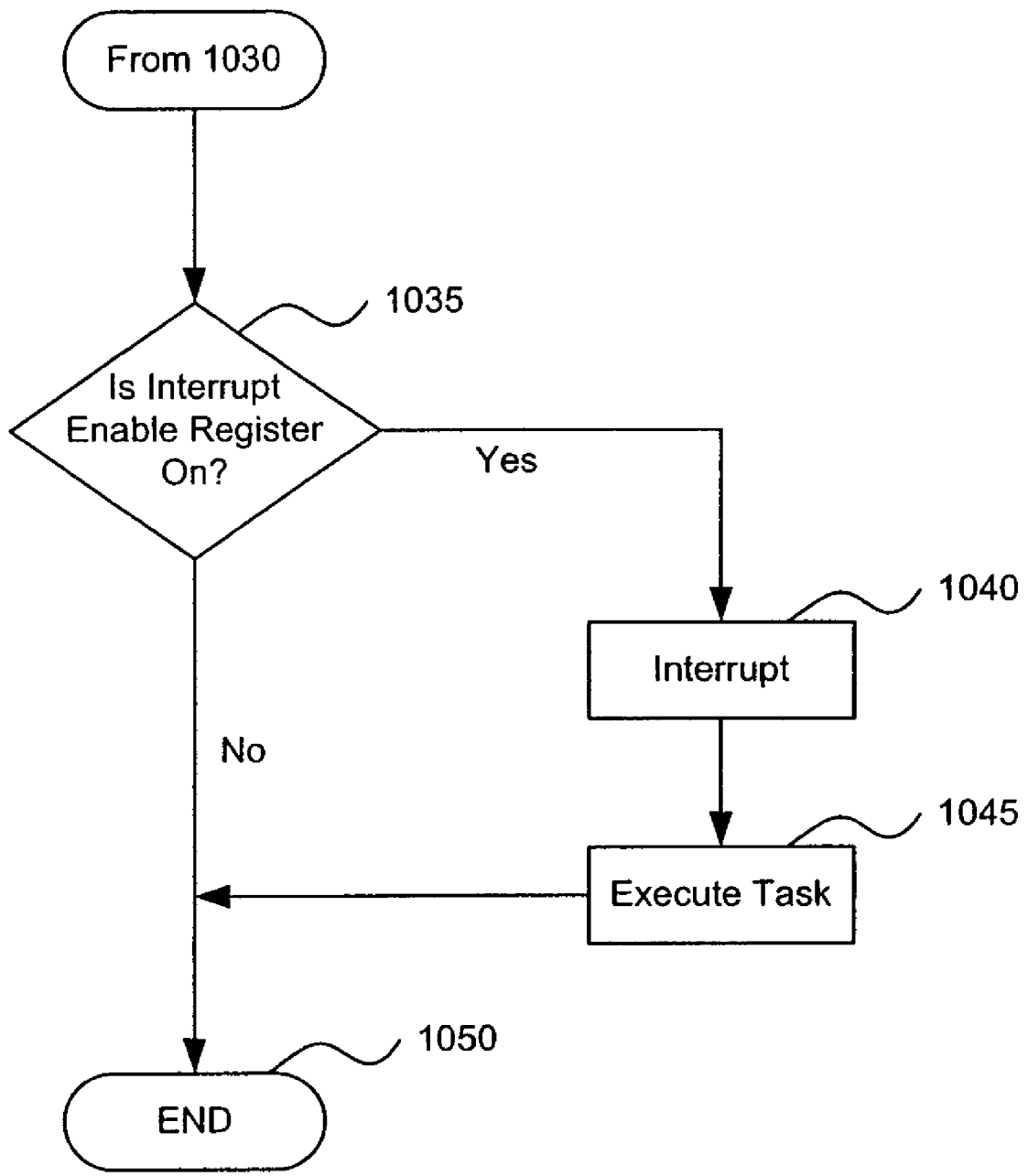

As previously discussed, in accordance with embodiments of the present invention, each node in the cluster graphics system 100 has the ability to switch from a participant with full read/write capability to a read only participant. Accordingly, any one of the nodes can be used to drive an interrupt. FIGS. 10A and 10B illustrate a flowchart of a method for generating global interrupts from any node in a cluster of nodes according to an embodiment of the present invention.

In an embodiment, prior to step 1015, each respective node will have its line enable register 830 turned off. Further, at least one sender node is identified. In an embodiment, master system 107 determines which nodes need to be driving the interrupt.

Referring to FIG. 10A, in a step 1015, the line enable registers 830 for each identified sender node is turned on. In an embodiment, one of the communications links is designated to carry the interrupt signal.

Next, a number of receiver nodes are identified (step 1020). The receiver nodes are intended to be the designated receivers of the global interrupt once it is issued.

In a step 1025, for each of the identified receiver nodes, its respective interrupt enable register 815 is turned on.

In a step 1030, an interrupt is sent from the identified sender node to each node.

Referring to FIG. 10Bm if the receiver interrupt enable register 815 for a particular receiver node is on (step 1035) then in a step 1040, that particular receiver node is interrupted.

Once interrupted, in a step 1045, a predetermined task is executed.

For a given receiver node, processing ends immediately at step 1050 if its interrupt enable register 1035 is not turned on or alternatively, upon completion of the predetermined task. In this way, when each identified sender node changes the state of the communications link by issuing an interrupt, only the identified receiver nodes will get interrupted.

The following is a high level pseudocode description for setting up a global interrupt in accordance with an embodiment of the present invention.

```
SetupGlobalInterrupt ( )
{
while (SENDERS) {
snd_by_ethernet (SENDER->nodeID, write_imageSync
(LINE_ENABLES_REG, LINE_ENABLES_MASK_ON);
}
while (RECEIVERS) {
snd_by_ethernet (RECEIVER->nodeID, write_imageSync
(INTR_ENABLES_REG, INTR_ENABLES_MASK_ON);
snd_by_ethernet (RECEIVERS->nodeID,
registerImageSyncIntrHandler (localIntrFunc));
}
}
```

The receiver nodes that have the receiver turned on, will get interrupted and will perform the tasks detailed in registerImageSyncIntrHandler (localIntrFunc)). In an embodiment, this can be used as a general purpose barrier in hardware.

VI. Conclusion

Various embodiments of the present invention have been described above. It should be understood that these embodiments have been presented by way of example only, and not limitation. It will be understood by those skilled in the relevant art that various changes in form and detail of the embodiments described above may be made without departing from the spirit and scope of the present invention as defined in the claims. Thus, the breadth and scope of the present invention should not be limited by any of the above-described exemplary embodiments, but should be defined only in accordance with the following claims and their equivalents.

What is claimed is:

1. A system for generating the display of synchronized images, the system comprising:
 a communications link;
 a cluster of nodes operatively connected to the communications link, wherein each of the nodes is configured with an ability to switch from a node with read capability and write capability to a node with only read capability and each of the nodes has a device driver operatively connected to a graphics processor, wherein the device driver is configured to handle an interrupt signal between a sender node and a receiver node and has a line enable register configured to determine if the device driver is configured to read via the communications link or to write via the communications link and an interrupt enable register configured to determine if the interrupt signal has been received, wherein the communications link is configured to provide simultaneous communication of the interrupt signal to at least one receiver node, and wherein the graphics processor is configured to receive a time synchronization signal; and
 a timing signal provider operatively connected to the communications link and configured to provide the time synchronization signal.

2. The system of claim 1, wherein the time synchronization signal is a clock signal or a video signal.

3. The system of claim 1, wherein the communications link is a multidrop cable, a daisy chain cable, or an Internet connection.

4. The method of claim 1, wherein a node within the cluster of nodes is designated the sender node by turning on the line enable register of the node.

5. A method for generating global interrupts, comprising:
 (a) determining that a predetermined task needs to be accomplished that requires interrupting an activity of one or more nodes within a cluster of nodes;
 (b) determining which node within said cluster of nodes is to be designated a sender node;
 (c) determining which nodes need to be interrupted;
 (d) for each of the nodes that need to be interrupted, putting said node into an interrupt enable state, wherein upon receipt of an interrupt said node will be interrupted;
 (e) sending said interrupt from said sender node to each node over a communication link;
 (f) interrupting processing of each node that was placed into said interrupt enable state upon receiving said interrupt;
 (g) determining which other nodes within the cluster of nodes will drive said interrupting; and
 (h) for each of said determined nodes that will drive said interrupting, turning on a line enable register of said node, whereby each node having said line enable register turned on becomes said sender node that issues said interrupt.

* * * * *